United States Patent [19]

Felixberger et al.

[11] Patent Number: 5,705,599

[45] Date of Patent: Jan. 6, 1998

US005705599A

[54] GRAFT POLYMERS OF KETONE-ALDEHYDE CONDENSATION AND CO-CONDENSATION PRODUCTS

[75] Inventors: Josef Felixberger, Traunstein; Johann Plank, Trostberg, both of Germany

[73] Assignee: SKW Trostberg Aktiengesellschaft, Trostberg, Germany

[21] Appl. No.: 581,536

[22] PCT Filed: Jul. 1, 1994

[86] PCT No.: PCT/EP94/02160

§ 371 Date: Dec. 29, 1995

§ 102(e) Date: Dec. 29, 1995

[87] PCT Pub. No.: WO95/01315

PCT Pub. Date: Jan. 12, 1995

[30] Foreign Application Priority Data

Jul. 2, 1993 [DE] Germany .................. 43 22 112.2

[51] Int. Cl.⁶ .................. C08G 2/18; C08G 6/02
[52] U.S. Cl. .................. 528/227; 128/230; 128/271; 128/503; 128/63; 128/515; 128/521; 524/142; 524/592; 524/593; 524/599
[58] Field of Search .................. 528/227, 230, 528/271, 503, 224; 525/63, 515, 521; 524/542, 592, 593, 599

[56] References Cited

U.S. PATENT DOCUMENTS 4,666,979  5/1987  Plank et al. .................. 525/54.4

*Primary Examiner*—Duc Truong
*Attorney, Agent, or Firm*—Felfe & Lynch

[57] ABSTRACT

Graft polymers of ketone-aldehyde condensation and co-condensation products and/or the monovalent or polyvalent metal compounds thereof are described, in which condensation product consists a) of symmetrical or asymmetrical ketones containing aliphatic, araliphatic, cyclic or aromatic hydro-carbon radicals with at least one nonaromatic radical, b) an aldehyde of the formula R—(CHO)$_n$, wherein n=1 to 2 and R can be hydrogen or an aliphatic, araliphatic, aromatic or heterocyclic radical, and c) optionally of carboxyl, sulpho, sulphamido, sulphoxy, sulphoalkylamine or sulphoalkyloxy groups, to which product anionic and/or nonionic and/or cationic unsaturated monomers have been grafted. These graft polymers are outstandingly suitable as dispersants for inorganic binder suspensions and solutions, for aqueous clay suspensions and solutions or coal/water suspensions, as retention agents, thickeners, in particular for aqueous systems, and as agents for preventing the swelling of clay in aqueous systems.

24 Claims, No Drawings

GRAFT POLYMERS OF KETONE-ALDEHYDE CONDENSATION AND CO-CONDENSATION PRODUCTS

BACKGROUND OF THE INVENTION

The present invention relates to graft polymers of ketone-aldehyde condensation products and co-condensation products and/or the monovalent or polyvalent metal compounds thereof, the preparation thereof and the use thereof.

Ketone-aldehyde condensation and co-condensation products have long been known. Thus, readily water-soluble condensation products of cycloalkanones and formaldehyde, with the use of sodium sulphite as a substance introducing acid groups, are described in, for example, German Auslegeschrift 23 41 923. However, a serious disadvantage of these condensation products is their low thermal stability, with the result that their range of uses is greatly limited.

Good thermal stability is a property of the acid group—containing condensation products of aldehydes and ketones according to German Offenlegungsschrift 31 44 673 and co-condensation products according to German Offenlegungsschrift 33 15 152 and the metal compounds of these (co-)condensation products according to German Offenlegungsschrift 34 29 068. Although these products can be used as thickeners, retention agents, surfactants, dispersants or liquefying agents for aqueous systems, the relevant product properties are not optimum in some fields of use.

It was therefore the object of the present invention to modify the ketone-aldehyde condensation, and co-condensation products and the metal compounds thereof, respectively, in such a way that the technical application properties of the. corresponding derivatives are further improved.

THE INVENTION

This object was achieved, according to the invention, by this provision of graft polymers of ketone-aldehyde condensation and co-condensation products, respectively, and/or the monovalent or polyvalent metal compounds thereof, which are characterized in that the condensation product consists a) of symmetrical or asymmetrical ketones containing aliphatic, araliphatic, cyclic or aromatic hydrocarbon radicals with at least one nonaromatic radical, b) an aldehyde of the formula R—$(CHO)_n$, where n=1 to 2 and R can be hydrogen or an aliphatic, araliphatic, aromatic or heterocyclic radical and c) optionally of acid groups, preferably carboxyl, sulpho, sulphamido, sulphoxy, sulphoalkylamine or sulphoalkyloxy groups, to which product anionic and/or nonionic and/or cationic unsaturated monomers have been grafted.

It has in fact surprisingly been found that the properties can be influenced in a specific manner by grafting the relevant unsaturated monomers onto the (co-)condensation products and the metal compounds thereof, respectively.

The parent structures of the graft polymers according to the invention consist of ketone-aldehyde condensation and co-condensation products, respectively, and/or the monovalent or polyvalent metal compounds thereof, as described, for example, in German Offenlegungsschrift 31 44 673, German Offenlegungsschrift 33 15 152 or German Offenlegungsschrift 34 29 068. The ketones used here are symmetrical or asymmetrical compounds containing aliphatic, araliphatic, cyclic or aromatic hydrocarbon radicals with at least one nonaromatic radical, the total number of carbon atoms and hetero atoms in the ketones preferably being 3 to 12. Suitable aliphatic radicals are straight-chain or branched, unsaturated and, preferably, saturated alkyl radicals, such as, for example, methyl, ethyl, propyl, isobutyl, etc. Araliphatic radicals are, for example, benzyl or phenethyl, and aromatic radicals are, for example, α- or β-naphthyl and preferably phenyl.

The ketones can also have one or more substituents, such as, for example, amino, hydroxyl, alkoxy, acetyl or alkoxycarbonyl groups. Examples of ketones containing saturated aliphatic radicals are acetone, methyl ethyl ketone and methyl isobutyl ketone, examples of ketones containing substituted aliphatic radicals are methoxyacetone, diacetone alcohol and ethyl acetoacetate, examples of ketones containing unsaturated. aliphatic radicals are methyl vinyl ketone, mesityl oxide and phorone, an example of a ketone containing araliphatic radicals is benzylacetone, examples of ketones containing cyclic radicals are cyclohexanone and cyclopentanone, and examples of ketones containing aromatic radicals are acetophenone and 4-methoxyacetophenone.

Suitable aldehydes of the formula R—$(CHO)_n$ are those compounds in which n is 1 to 2 and R is hydrogen or an aliphatic, araliphatic, aromatic or heterocyclic radical, the total number of carbon atoms and hetero atoms preferable assuming a value of 1 to 11. Aliphatic radicals are, in particular, alkyl radicals, preferably having 1 to 6 carbon atoms, such as, for example, methyl, ethyl, propyl, butyl, etc. The aliphatic radicals can also be branched or unsaturated (such as, for example, vinyl). Aromatic radicals are, for example, α- or β-naphthyl, or phenyl, and heterocyclic radicals are, for example, furfuryl.

The aldehydes can also have one or more substituents, such as, for example, amino, hydroxyl, alkoxy or alkoxycarbonyl groups and/or also the acid groups optionally contained in the condensation products. Aldehydes containing more than one aldehyde group, namely in particular dialdehydes, can also be used. It is also possible to use the lower saturated, aldehydes, such as formaldehyde or acetaldehyde, in their polymeric form (paraformaldehyde or paraldehyde). Examples of aldehydes containing saturated aliphatic radicals are formaldehyde (or paraformaldehyde), acetaldehyde (or paraldehyde) and butyraldehyde. Examples of aldehydes containing substituted saturated aliphatic radicals are methoxyacetaldehyde, 3-methoxyproptonaldehyde and acetaldol. Examples of aldehydes containing unsaturated aliphatic radicals are acrolein and crotonaldehyde. Examples of aldehydes containing araliphatic radicals are phenylacetaldehyde and phenylpropionaldehyde. Examples of aldehydes containing aromatic or heterocyclic radicals are benzaldehyde, furfurol and 4-methoxyfurfurol. For example, glyoxal or glutardialdehyde can be used as dialdehydes. Formaldehyde is particularly preferably used as the aldehydes.

The relevant ketone-aldehyde condensation and co-condensation products, respectively, can optionally also contain acid groups, preferably carboxyl, sulpho, sulphamido, sulphoxy, sulphoalkylamine or sulphoalkyloxy groups. An alkyl group in these radicals preferably has 1 to 5 carbon atoms and is in particular methyl or ethyl. Preferably inorganic acids such as amidosulfonic acid or their salts such as sodium sulfite, sodium bisulfite and sodium pyrosulfite or organic acids especially carboxylic acids such as aminoacetic acid are used as compounds introducing the acid group. The relevant condensation or co-condensation products can also contain two or more different acid groups.

The molar ratio of compounds introducing ketones/aldehydes/acid groups can be varied within wide limits and is, as a rule, 1:0.5 to 18:0 to 3. The co-condensation products, which are described in, for example, German Offenlegungsschrift 33 15 152, also contain, in addition to the ketone, aldehyde and, optionally, the acid groups, 2 to 60% by weight, preferably 10 to 40% by weight, of a further component selected from the group comprising aminoplast formers and/or aromatic compounds and/or a lignin and/or lignite derivative. All common nitrogen-containing compounds, in particular those which are suitable for condensation with formaldehyde, can be used here as aminoplast formers, in particular urea, melamine, dicyandiamide or a guanamine (preferably acetoguanamine or benzoguanamine).

Phenols which are suitable for the formation of phenol resins, that is to say, in particular, phenol, cresols or xylenols, can preferable be used as aromatic compounds, but reactive substituted and/or polynuclear aromatics, such as, for example, naphthalene and the derivatives thereof, may also be used. The aminoplast formers or aromatic compounds can also be used completely or partially in the form of their precondensates or condensation products having different degrees of condensation. Aminoplast formers and aromatic compounds which contain acid groups, such as, for example, naphthalenesulphonic acids, may also be used.

The lignite compounds used may be pure lignite, alkali-treated lignite and/or sulphonated or sulphoalkylated lignite. For the purposes of the present invention, lignin compounds also include black liquors which are formed in the treatment of wood with sodium sulphite (sulphite process), but also ligninsulphonates and the formaldehyde resins thereof. The lignins or lignites can also be used in the form of their metal compounds (in particular iron and chromium).

Instead of the condensation and/or co-condensation products, it is also possible to use the monovalent or polyvalent metal compounds thereof, as described in German Offenlegungsschrift 34 29 068. Metal compounds containing metals of groups II A to VIII A and/or of groups I B to V B (according to the definition of Kirk-Othmer, Encyclopedia of Chemical Technology, Interscience Publishers, New York-London-Sydney, 2nd Edition 1965, Vol. 8, pages 94 to 96) are preferably suitable as metal compounds, in particular the monovalent or polyvalent inorganic or organic salts of these metals being used.

Examples of metal compounds are divalent or tetravalent manganese salts, divalent nickel salts, divalent or tetravalent lead salts, trivalent or hexavalent chromium compounds, divalent or trivalent iron compounds, trivalent aluminium compounds, monovalent and divalent copper compounds, divalent magnesium compounds and trivalent bismuth compounds. The amount of metal in these metal compounds is <70% by weight, preferably 0.1 to 20% by weight. The preparation of these metal compounds is described in German Offenlegungsschrift 34 29 068.

It is regarded as essential for the invention that anionic and/or nonionic and/or cationic unsaturated monomers have been grafted onto these relevant ketone-aldehyde condensation and co-condensation products, respectively, or the metal compounds thereof.

Vinyl compounds containing carboxyl, sulpho or phosphoric acid groups are preferably used as anionic unsaturated monomers. Examples of such unsaturated compounds containing carboxyl groups are acrylic acid, methacrylic acid, maleic acid, fumaric acid, iraconic acid and the salts thereof. Examples of vinyl compounds containing sulpho groups are vinylsulphonic acid, allylsulphonic acid, methallylsulphonic acid, 2-acrylamido-2-methylpropanesulfonic acid, styrenesulphonic acid and the salts thereof. Examples of vinyl compounds containing phosphoric acid groups are vinylphosphonic acid, 2-acrylamido-2-methylpropanephosphonic acid and methacryloxyethyl phosphate.

The anionic unsaturated monomer compounds can also be replaced by nonionic monomers, vinyl or acrylic derivatives being regarded as preferred. In particular, N-vinylpyrrolidone, acrylamide, methacrylamide, N,N-dimethylacrylamide, acrolein, mesityl oxide, allyl alcohol, acrylonitrile, vinyl acetate and styrene are used here. Further examples of such unsaturated compounds are the esters of the above mentioned unsaturated acids.

Finally, it is also possible to use, for the grafting, cationic unsaturated monomers which are preferably quaternary ammonium compounds. Examples of such quaternary ammonium compounds are methacryloyloxyethyltrimethylammonium chloride (METAC), (meth)acrylamidopropyltrimethylammonium chloride (MAPTAC), trimethylallyloxyethylammonium chloride (TAAC) and dimethyldiallylammonium chloride (DMDAAC).

The weight ratio of ketone-aldehyde condensation or co-condensation product to unsaturated monomer can be varied within wide limits, but it has proved particularly advantageous to adjust this ratio to 1:0.02 to 10. The procedure of the grafting reaction is relatively uncritical and can be carried out by the customary known methods. The grafting reaction is preferably carried out in aqueous solution at a temperature of 0° to 100° C. and at a pH of 1 to 13, the customary free radical initiators based on redox systems, such as, for example, $H_2O_2$ and iron(II) salts (such as, for example, iron(II) sulphate heptahydrate), peroxodisulphate/pyrosulphite or sulphite or cerium(IV) salts, or thermal initiators, such as AIBN or organic or inorganic peroxides, being relied upon.

After the grafting reaction has been carried out, which as a rule is completed after a few hours, the reaction solution is preferably rendered neutral with the customary bases or acids. The graft polymer solution formed usually has a solids content of between 5 and 50% by weight.

Depending on the molecular weight and the type of unsaturated monomer used, the graft polymers according to the invention are suitable as dispersants, retention agents, thickeners and agents for preventing the swelling of clay. Suitable dispersants are, as a rule, graft polymers on the basis of short-chain ketone-aldehyde condensation products having a molecular weight of <150,000 and having a high content of acid groups and/or anionic monomers. It is critical here that the graft polymers have a negative overall charge. These graft polymers are outstandingly suitable for dispersing inorganic binder suspensions or solutions, for example for dispersing Portland cement, plaster or oil well cement slurries. These products are equally suitable for dispersing clay suspensions and solutions, as used, for example, in drilling fluids in the form of bentonite suspensions.

If the graft polymers according to the invention are used on the basis of long-chain ketone-aldehyde condensation products having a molecular weight of >50,000 and the graft polymers having an anionic, nonionic or cationic charge, these products can be preferably used as retention agents for aqueous systems. These products generally prevent the release of water from water-containing media, such as, for example, concrete, mortar, cement slurries, plaster and anhydrite slurries, clay slurries, etc.

The graft polymers according to the invention can also be used as thickeners, in particular for aqueous systems, if graft polymers on the basis of very long-chain ketone-aldehyde condensation products having a molecular weight of >75,000 and the graft polymers having an anionic, nonionic or cationic charge are used. These products are very suitable for increasing the viscosity of aqueous solutions or suspensions and can be successfully used, for example, for thickening oil well cement slurries.

Finally, the graft polymers according to the invention can also be used as agents for preventing the swelling of clay in aqueous systems, if graft polymers on the basis of short-chain to long-chain ketone-aldehyde condensation products having a molecular weight of 500 to 2,000,000 and the graft polymers having a cationic or neutral charge are used. These products prevent, for example, the swelling of clays, such as, for example, of drilled clay-containing solids in drilling fluids.

By varying the molecular weight and the type of charge, it is also possible, for the purposes of the present invention, to prepare products having combined properties.

The Examples which follow are intended to illustrate the invention in more detail. Table 1 gives an overview of the starting material used in the Preparation Examples.

The yellow reaction solution is heated to 60° C. and air is displaced from the stirred vessel by a continuous stream of nitrogen.

5.8 parts by weight of iron(II) sulphate heptahydrate and 45.0 parts by weight of acrylic acid are added at intervals of 30 minutes, and after further 30 minutes 2.4 parts by weight of 30% strength hydrogen peroxide solution are metered in uniformly in the course of 1 minute by means of a peristaltic pump. Thereafter, the reaction solution is stirred for a further 2 hours at 60° C. and, after cooling to room temperature, is rendered neutral with 35% strength sodium hydroxide solution.

The brown low-viscosity graft polymer solution has a solids content of 38% by weight.

Example A.2

119.2 parts by weight of water,
20.0 parts by weight of sodium sulphite,
7.2 parts by weight of urea and
34.6 parts by weight of diacetone alcohol are initially introduced in the stated order in a stirred vessel with an internal thermometer and reflux condenser and are heated to 60° C.

TABLE 1

Synthesis Examples

| Example | Ketone | Backbone Aldehyde | Compound with acid groups | Co-condensation component or metal compound | Graft monomer |
|---|---|---|---|---|---|
| A.1 | Acetophenone | Paraformaldehyde | Sodium sulphite | — | Acrylic acid |
| A.2 | Diacetone alcohol | Formaldehyde | Sodium sulphite | Urea | Acrylic acid |
| A.3 | Cyclohexanone | Formaldehyde | Sodium sulphite | — | Acrylamide/Maleic anhydride |
| A.4 | Acetone | Formaldehyde | Amidosulphonic acid | — | Maleic anhydride |
| A.5 | Acetone | Formaldehyde | Aminoacetic acid | Phenol | Styrenesulphonic acid |
| A.6 | Acetylacetone | Acrolein | Sodium sulphite | — | Methacryloyloxyethyl phosphate |
| A.7 | Acetophenone | Paraformaldehyde | Sodium sulphite | — | Acrylic acid/Vinyl acetate |
| A.8 | Diacetone alcohol | Crotonaldehyde | Sodium pyrosulphite | — | Acrylamidopropionicsulphonic acid |
| A.9 | Acetone | Crotonaldehyde/Furfurol | Sodium sulphite | — | Itaconic acid |
| A.10 | Ethyl methyl ketone | Crotonaldehyde | Aminoacetic acid | — | Acrylamide |
| A.11 | Mesityl oxide | Formaldehyde | Sodium sulphite | — | Acrylamide |
| A.12 | Mesityl oxide | Formaldehyde | Sodium sulphite | — | N,N-Dimethylacrylamide |
| A.13 | Mesityl oxide | Formaldehyde | Sodium sulphite | — | N-Vinylpyrrolidone |
| A.14 | Ethyl methyl ketone | Crotonaldehyde | Aminoacetic acid | — | N-Vinylpyrrolidone |
| A.15 | Acetylacetone | Acrolein | Sodium sulphite | — | Acrolein |
| A.16 | Diacetone alcohol | Formaldehyde | Sodium sulphite | — | Diallyldimethylammonium chloride |
| A.17 | Acetone | Formaldehyde | Sodium sulphite | $Fe_2(SO_4)_3$ $Na_2Cr_2O_7 \cdot x2H_2O$ | Acrylic acid |
| A.18 | Mesityl oxide | Formaldehyde | Sodium sulphite | — | N-Vinylpyrrolidone (Starter: AIBN) |
| A.19 | Acetone | Formaldehyde | — | — | N-Vinylpyrrolidone (Starter: AIBN) |

A. Synthesis Examples

Example A.1

283.0 parts by weight of water,
118.9 parts by weight of sodium sulphite and
84.9 parts by weight of paraformaldehyde are initially introduced in the stated order in a stirred vessel with an internal thermometer and reflux condenser and are heated to 60° C.

113.2 parts by weight of acetophenone are added dropwise, slowly and uniformly, to this initially introduced mixture. After introduction of the ketone, the solution is stirred for a further 2 hours at 90° C. and, after cooling to room temperature, is adjusted to pH 2 with 50% strength sulphuric acid.

119.1 parts by weight of 30% strength formaldehyde are added dropwise, slowly and uniformly, to this initially introduced mixture so that the temperature increases to 90° C. Stirring is carried out at 90° C. for 1.5 hours and the mixture is diluted with water as required.

After cooling to room temperature, the viscous solution is adjusted to pH 2 with 50% strength sulphuric acid and heated to 60° C. Air is displaced from the stirred vessel by a continuous stream of nitrogen.

18.5 parts by weight of iron(II) sulphate heptahydrate,
200.0 parts by weight of water and
14.4 parts by weight of acrylic acid are added at intervals of 30 minutes and after further 30 minutes 7.6 parts by weight of 30% strength hydrogen peroxide solution are metered in uniformly in the course of 1 minute by means of a peristaltic pump. Thereafter, the reaction solution is stirred for a further 2 hours at 60° C. and, after cooling to room temperature, is rendered neutral with 35% strength sodium hydroxide solution.

The brown, high-viscosity gel has a solids content of 13% by weight.

Example A.3

200 parts by weight of water, 84 parts by weight of sodium sulphite and 98 parts by weight of cyclohexanone are initially introduced in the stated order in succession in a stirred vessel with an internal thermometer and with a reflux condenser and are heated to 30° C. with thorough stirring.

A total of 170 parts by weight of formaldehyde solution (30% strength) is allowed to flow into this initially introduced mixture from a storage vessel, and the temperature should increase from 90° to 95° C. by the end of the introduction of the formalin. After the introduction of the formalin, the solution is kept at 90° to 95° C. for a further 2 hours and, after cooling to 60° C., is adjusted to pH 2 with 50% strength sulphuric acid.

The cloudy yellow reaction solution is heated to 60° C., and air is displaced from the stirred vessel by a continuous stream of nitrogen.

33.7 parts by weight of iron(II) sulphate heptahydrate, 15.0 parts by weight of acrylamide and 15.0 parts by weight of maleic anhydride are added at intervals of 30 minutes and, after a further 30 minutes 13.7 parts by weight of 30% strength hydrogen peroxide solution are metered in uniformly in the course of 2 minutes by means of a peristaltic pump. Thereafter, the reaction solution is stirred for a further 2 hours at 60° C. and, after cooling to room temperature, is adjusted to pH 7 with 35% strength sodium hydroxide solution.

The brown, low-viscosity graft polymer solution has a solids content of 38% by weight.

Example A.4

246.6 parts by weight of water, 39.9 parts by weight of amidosulphonic acid, 19.3 parts by weight of calcium hydroxide and 47.7 parts by weight of acetone are initially introduced in the stated order in succession in a stirred vessel with an internal thermometer and reflux condenser and are heated until acetone reflux begins.

A total of 246.6 parts by weight of 30% strength formaldehyde solution are allowed to flow into this initially introduced mixture from a storage vessel, and the temperature should increase to 90° C. by the end of the introduction of the formalin. After the introduction of the formalin, the solution is kept at 90° C. for a further 24 hours and, after cooling to room temperature, is adjusted to pH 2 with 50% strength sulphuric acid.

The orange solution is heated to 60° C., and air is displaced from the stirred vessel by a continuous stream of nitrogen.

21.3 parts by weight of iron(II) sulphate heptahydrate and 22.5 parts by weight of maleic anhydride are added at intervals of 30 minutes and, after a further 30 minutes, 8.7 parts by weight of 30% strength hydrogen peroxide solution are metered in by means of a peristaltic pump in the course of 1 minute.

Thereafter, the reaction solution is stirred for a further 2 hours at 60° C. and, after cooling to room temperature, is rendered neutral with 35% strength sodium hydroxide solution.

The reddish brown, low-viscosity graft polymer solution has a solids content of 23% by weight.

Example A.5

161.3 parts by weight of water, 36.9 parts by weight of solid sodium hydroxide, 34.6 parts by weight of aminoacetic acid, 43.4 parts by weight of phenol and 26.8 parts by weight of acetone are initially introduced in the stated order in a stirred vessel with an internal thermometer and reflux condenser and are heated until acetone reflux begins.

A total of 138.3 parts by weight of 30% strength formaldehyde solution are allowed to flow into this initially introduced mixture from a storage vessel, and the temperature should increase to 95° C. by the end of the introduction of the formalin. After the introduction of the formalin, the solution is kept at 95° C. for a further 1 hour and, after cooling to room temperature, is adjusted to pH 2 with 50% strength sulphuric acid.

The orange-red reaction solution is heated to 60° C., and air is displaced from the stirred container by a continuous stream of nitrogen.

26.0 parts by weight of iron(II) sulphate heptahydrate and 60.0 parts by weight of styrenesulphonic acid, are added at intervals of 30 minutes and, after a further 30 minutes, 11.0 parts by weight of 30% strength hydrogen peroxide solution are metered in by means of a peristaltic pump in the course of 1 minute.

Thereafter, the reaction solution is stirred for a further 2 hours at 60° C. and, after cooling to room temperature, is rendered neutral with 35% strength sodium hydroxide solution.

The dark brown, low-viscosity graft polymer solution has a solids content of 34% by weight.

Example A.6

344.3 parts by weight of water, 49.2 parts by weight of acetylacetone and 123.9 parts by weight of sodium sulphite are initially introduced in the stated order in succession in a stirred vessel with an internal thermometer and reflux condenser and are heated to an internal temperature of 60° C.

A total of 82.6 g of acrolein are added dropwise to this solution. Owing to the highly exothermic reaction, the acrolein is added by a procedure in which the first tenth is added slowly and uniformly and the reaction is then allowed to start, this being evident from the incipient yellow colour of the initially introduced mixture and vigorous acetone reflux. The remaining 90% of the acrolein are added dropwise with cooling. Stirring is then carried out for 4 hours at 90° C., the reaction solution becoming deep red.

After the mixture has cooled to room temperature, the pH is adjusted to 2 with 50% strength sulphuric acid, the mixture is heated to 60° C. and the air is displaced from the reaction container by a continuous stream of nitrogen.

13.2 parts by weight of iron(II) sulphate heptahydrate and 30.0 parts by weight of methacryloxyethyl phosphate are added at intervals of 30 minutes and, after a further 30 minutes, 5.4 parts by weight of 30% strength hydrogen peroxide solution are metered in uniformly and continuously in the course of 1 minute by means of a peristaltic pump.

The reaction solution is then stirred for a further 2 hours at 60° C. and, after cooling to room temperature, is rendered neutral with 35% strength sodium hydroxide solution.

The ochre-colored graft polymer solution has a solids content of 39% by weight.

Example A.7

283.0 parts by weight of water, 118.9 parts by weight of sodium sulphite and 84.9 parts by weight of paraformaldehyde are initially introduced in the stated order in succession in a stirred vessel with an internal thermometer and reflux condenser and are heated to 60° C.

113.2 parts by weight of acetophenone are added dropwise, slowly and uniformly, to this solution so that the internal temperature does not exceed 70° C. After the end of the addition of the ketones, stirring is continued for 2 hours at 90° C.

After the mixture has cooled to room temperature, the pH is adjusted to 2 with 50% strength sulphuric acid, the reaction solution is heated to 60° C. and the air is displaced from the reaction container by a continuous stream of nitrogen.

57.4 parts by weight of iron(II) sulphate heptahydrate and 15.0/30.0 parts by weight of vinyl acetate and acrylic acid are added at intervals of 30 minutes and, after a further 30 minutes, 22.4 parts by weight of 30% strength hydrogen peroxide solution are metered in uniformly in the course of 1 minute by means of a peristaltic pump.

The reaction solution is then stirred for a further 2 hours at 60° C. and, after cooling to room temperature, is rendered neutral with 35% strength sodium hydroxide solution.

The brown solution has a solids content of 38% by weight.

Example A.8

280.0 parts by weight of water, 22.2 parts by weight of sodium pyrosulphite and 27.2 parts by weight of diacetone alcohol are initially introduced in the stated order in a stirred vessel with an internal thermometer and reflux condenser and are heated to 70° C.

12.0 parts by weight of sodiumhydroxide and 10.0 parts by weight of crotonaldehyde are added to the heated initially introduced mixture. A further 88.0 parts by weight of crotonaldehyde are added with cooling, so that the internal temperature does not exceed 70° C. Stirring is continued for 30 minutes at 90° C., the mixture is cooled to room temperature and the pH is adjusted to 2 with 50% strength sulphuric acid.

The deep red reaction solution is heated to 60° C., and air is displaced from the stirred vessel by a continuous stream of nitrogen.

13.6 parts by weight of iron(II) sulphate heptahydrate and 30.0 parts by weight of acrylamidopropanesulphonic acid are added at intervals of 30 minutes, and after further 30minutes 5.6 parts by weight of 30% strength hydrogen peroxide solution are metered in by means of a peristaltic pump in the course of 1 minute.

The reaction solution is then stirred for a further 2 hours at 60° C. and, after cooling to room temperature, is rendered neutral with 35% strength sodium hydroxide solution.

The brown low-viscosity graft polymer solution has a solids content of 34% by weight.

Example A.9

405.9 parts by weight of water, 42.6 parts by weight of sodium sulphite and 39.2 parts by weight of acetone are initially introduced in the stated order in a stirred vessel with an internal thermometer and reflux condenser and are heated to 56° C.

A mixture of 64.9 parts by weight of furfurol and 47.4 parts by weight of crotonaldehyde is added dropwise to the initially taken mixture, the internal temperature being kept at 70° C. by cooling. After the addition of aldehyde is complete, stirring is carried out for 4 hours at 90° C., the mixture is cooled to room temperature and the pH is adjusted to 2 with 50% strength sulphuric acid. The reaction solution is heated to 60° C., and air is displaced from the stirred vessel by a continuous stream of nitrogen.

26.8 parts by weight of iron(II) sulphate heptahydrate, 125.0 parts by weight of water and 37.5 parts by weight of itaconic acid are added at intervals of 30 minutes and after further 30minutes 10.9 parts by weight of 30% strength hydrogen peroxide solution are metered in uniformly in the course of 1 minute by means of a peristaltic pump.

The reaction solution is then stirred for a further 2 hours at 60° C. and, after cooling to room temperature, is rendered neutral with 35% strength sodium hydroxide solution.

The brown graft polymer solution has a solids content of 27% by weight.

Example A.10

346.3 parts by weight of water, 75.7 parts by weight of crotonaldehyde, 38.9 parts by weight of methyl ethyl ketone and 5.4 parts by weight of potassium carbonate are initially introduced in the stated order in a stirred vessel with an internal thermometer and reflux condenser and are stirred for 5 hours at 85° C.

52.5 parts by weight of aminoacetic acid and 43.3 parts by weight of water are added to the orange solution and 37.9 parts by weight of crotonaldehyde are added so that the temperature increases to 90° C. Stirring is continued for 2 hours at 90° C, and the mixture is cooled to 20° C, the pH is adjusted to 2 with 50% strength sulphuric acid and air is displaced from the stirred vessel by a continuous stream of nitrogen.

156.4 parts by weight of iron(II) sulphate heptahydrate and 120.0 parts by weight of acrylamide are added at intervals of 30 minutes, and after further 30minutes 64.0 parts by weight of 30% strength hydrogen peroxide solution are metered in uniformly in the course of 5 minutes by means of a peristaltic pump.

The reaction solution is stirred for 2 hours at 60° C. and, after cooling to room temperature, is rendered neutral with 35% strength sodium hydroxide solution.

The brown graft polymer solution has a solids content of 31% by weight.

Example A.11

17.6 parts by weight of water, 43.1 parts by weight of mesityl oxide and 72.1 parts by weight of sodium sulphite are initially introduced in the stated order in succession in a stirred vessel with an internal thermometer and reflux condenser and are heated to 90° C.

A total of 176.0parts by weight of 30% strength formaldehyde solution are allowed to flow into this initially introduced mixture from a storage vessel, the temperature being kept at between 90° and 95° C. by cooling until the end of the introduction of the formalin. After the introduction of the formalin, the solution is kept at 90° to 95° C. for a further hour. In order to keep the reaction solution stirtable, it is diluted with water as required.

After the reaction solution has cooled to room temperature, the pH is adjusted to 2 with 50% strength sulphuric acid. The deep red reaction solution is heated to 60° C., and air is displaced from the stirred vessel by a continuous stream of nitrogen.

73.0 parts by weight of iron( II ) sulphate heptahydrate and 186.6 parts by weight of acrylamide are added at intervals of 30 minutes, and after a further 30 minutes, 29.8 parts by weight of 30% strength hydrogen peroxide solution are metered in with cooling in the course of 10 minutes by means of a peristaltic pump.

The reaction solution is then stirred for a further 2 hours at 600° C. and, after cooling to room temperature, is rendered neutral with 35% strength sodium hydroxide solution.

The brown graft polymer solution has a solids content of 21% by weight.

Example A.12

4.6 parts by weight of water, 11.2 parts by weight of mesityl oxide and 18.7.parts by weight of sodium sulphite are initially introduced in the stated order in succession in a stirred vessel with an internal thermometer and reflux condenser and are heated to 90° C.

A total of 45.7 parts by weight of 30% strength formaldehyde solution are fed into this initially introduced mixture from a storage vessel, the temperature being kept at between 90° and 95° C. by cooling until the end of the introduction of the formalin. After the introduction of the formalin, the solution is kept at 90° to 95° C. for a further hour. In order to keep the reaction solution stirrable and to dilute the solution to a solids content of about 5% by weight 637 parts by weight of water are added successively.

After the reaction solution has cooled to room temperature, the pH is adjusted to 2 with 50% strength sulphuric acid. The deep red reaction solution is heated to 60° C., and air is displaced from the stirred vessel by a continuous stream of nitrogen.

0.10 part by weight of iron(II) sulphate heptahydrate and 36.0 parts by weight of N,N-dimethylacrylamide are added at intervals of 30 minutes, and after a further 30 minutes, 4.1 parts by weight of 0.3% strength hydrogen peroxide solution are metered in by means of a peristaltic pump in the course of 1 minute.

The reaction solution is then stirred for a further 2 hours at 60° C. and, after cooling to room temperature, is rendered neutral with 35% strength sodium hydroxide solution.

The red graft polymer solution has a solids content of 7% by weight.

Example A.13

35.2 parts by weight of water, 86.2 parts by weight of mesityl oxide and 144.1 parts by weight of sodium sulphite are initially introduced in the stated order in succession in a stirred vessel with an internal thermometer and reflux condenser and are heated to 90° C.

A total of 352.0 parts by weight of 30% strength formaldehyde solution are allowed to flow into this initially introduced mixture from a storage vessel, the temperature being kept at between 90° and 95° C. by cooling until the end of the introduction of the formalin. After the introduction of the formalin, the solution is kept at 90° to 95° C. for a further hour. In order to keep the reaction solution stirrable, it is diluted with water as required.

After the reaction solution has cooled to room temperature, the pH is adjusted to 2 with 50% strength sulphuric acid. The deep red reaction solution is heated to 60° C., and air is displaced from the stirred vessel by a continuous stream of nitrogen.

75.0 parts by weight of iron(II) sulphate heptahydrate and 90.0 parts by weight of N-vinyl-2-pyrrolidone are added at intervals of 30 minutes, and after a further 30 minutes, 30.6 parts by weight of 30% strength hydrogen peroxide solution are metered in by means of a peristaltic pump in the course of 2 minutes.

The reaction solution is then stirred for a further 2 hours at 60° C. and, after cooling to room temperature, is rendered neutral with 35% strength sodium hydroxide solution.

The brown graft polymer solution has a solids content of 40% by weight.

Example A.14

346.3 parts by weight of water, 75.7 parts by weight of crotonaldehyde, 38.9 parts by weight of methyl ethyl ketone and 5.4 parts by weight of potassium carbonate are initially introduced in the stated order in a stirred vessel with an internal thermometer and reflux condenser and are stirred for 5 hours at 80° C.

Thereafer, 43.3 parts by weight of water and 52.5 parts by weight of aminoacetic acid are added at 80° C. and 37.9 parts by weight of crotonaldehyde are added so that the temperature increases to 90° C.

The reaction solution is stirred for 2 hours at 90° C. and, after cooling to room temperature, is adjusted to pH 2 with 50% strength sulphuric acid. The reaction solution is heated to 60° C., and air is displaced from the stirred vessel by a continuous stream of nitrogen.

18.1 parts by weight of iron(II) sulphate heptahydrate and 266.7 parts by weight of N-vinylpyrrolidone are added at intervals of 30 minutes, and after further 30 minutes 7.5 parts by weight of 30% strength hydrogen peroxide solution are metered in uniformly in the course of 1 minute by means of a peristaltic pump.

The reaction solution is then stirred for a further 2 hours at 60° C. and, after cooling to room temperature, is rendered neutral with 35% strength sodium hydroxide solution.

The brown suspension has a solids content of 27% by weight.

Example A.15

344.3 parts by weight of water, 123.9 parts by weight of sodium sulphite and 49.2 parts by weight of acetylacetone are initially introduced in the stated order in a stirred vessel with an internal thermometer and reflux condenser and are heated to 60° C.

82.6 g of acrolein are added dropwise to this initially taken mixture so that the temperature does not exceed 70° C. After the addition of the aldehyde is complete, the solution is stirred for a further 4 hours at 90° C. and, after cooling to room temperature, is adjusted to pH 2 with 50% strength sulphuric acid.

The deep red reaction solution is heated to 60° C., and air is displaced from the stirred container by a continuous stream of nitrogen.

37.7 parts by weight of iron(II) sulphate heptahydrate and 45.6 parts by weight of acrolein are added at intervals of 30 minutes and 15.4 parts by weight of 30% strength hydrogen peroxide solution are metered in uniformly in the course of 1 minute by means of a peristaltic pump.

The reaction solution is then stirred for a further 2 hours at 60° C. and, after cooling to room temperature, is rendered neutral with 35% strength sodium hydroxide solution.

The dark brown graft polymer solution of medium viscosity has a solids content of 40% by weight.

Example A.16

63.3 parts by weight of water, 63.3 parts by weight of 30% strength formaldehyde solution, 52.4 parts by weight of diacetone alcohol and 4.5 parts by weight of potassium carbonate are initially introduced in succession, according to Example 1, in the stirred vessel and stirred at an internal temperature of 30° C. for 8 hours.

28.5 parts by weight of sodium sulphite are added to the yellow solution, which is then heated to 60° C., the solution becoming red. 72.1 parts by weight of 30% strength formaldehyde solution are added dropwise from a storage vessel so that the temperature of the reaction solution increases to 90° C. After the introduction of the formalin, the solution is kept at 90° C. for a further hour. In order to keep the solution stirtable, it is diluted with water as required. The viscous solution has a solids content of 14.1% by weight.

After the solution has cooled to room temperature, the pH is adjusted to 2 with 50% strength sulphuric acid. The deep red reaction solution is heated to 60° C., and air is displaced from the stirred container by a continuous stream of nitrogen.

0.93 part by weight of iron(II) sulphate heptahydrate and 90.0 parts by weight of diallyldimethylammonium chloride are added at intervals of 30 minutes and, after a further 30 minutes, 3.8 parts by weight of 3% strength hydrogen peroxide solution are metered in uniformly in the course of 10 seconds by means of a pipette.

The reaction solution is then stirred for a further 2 hours at 60° C. and, after cooling to room temperature, is rendered neutral with 35% strength sodium hydroxide solution.

The red viscous graft polymer solution has a solids content of 18% by weight.

Example A.17

129.1 parts by weight of water, 54.2 parts by weight of sodium sulphite and 39.9 parts by weight of acetone are initially introduced in the stated order in a stirred vessel with an internal thermometer and reflux condenser and are heated to 56° C.

As soon as the acetone reflux begins, a total of 258.2 parts by weight of 30% strength formaldehyde solution are added dropwise. Owing to the highly exothermic reaction, the first tenth of the formalin solution is added slowly and uniformly. After the reaction has started, which is evident from the incipient yellow color of the initially introduced mixture and increased acetone reflux, the remaining formalin is added, the temperature of the batch being allowed to increase to the boiling point. After the addition of the formaldehyde, a 30 minute thermal after treatment of the batch at 95° C. is also carried out.

After the solution has cooled to room temperature, its pH is adjusted to 4 with acetic acid.

68.6 parts by weight of a 40% strength aqueous iron(III) sulphate solution are added to the 29% strength resin solution, and the batch is stirred for 2 hours at room temperature, the pH increasing to 8.

For the preparation of the iron-chromium compound, 50.0 parts by weight of a 40% strength aqueous solution of sodium dichromate dihydrate are added to the solution of the iron compound and stirring is carried out again for 2 hours at room temperature. The additions of iron salt and chromium salt correspond to an amount of about 5% of iron or chromium, based on resin used. The resulting brown solution of the iron-chromium compound has a solids content of 29%. Its Brookfield viscosity is 17 mPas at room temperature. The pH of the brown resin solution is reduced to 2 with 50% strength sulphuric acid. The solution is heated to 60° C., and air is displaced from the stirred vessel by a continuous stream of nitrogen.

33.7 parts by weight of iron(II) sulphate heptahydrate and 87.3 parts by weight of acrylic acid are added at intervals of 30 minutes, and after further 30 minutes 13.7 parts by weight of 30% strength hydrogen peroxide solution are metered in uniformly in the course of 2 minutes by means of a peristaltic pump. When the hydrogen peroxide is added, the reaction solution becomes highly viscous.

The reaction solution is stirred for 2 hours at 60° C., diluted with 200 g of water and, after cooling to room temperature, neutralized with 35% strength sodium hydroxide solution, with the result that the viscosity of the solution again decreases.

The brown graft polymer has a solids content of 30% by weight.

Example A.18

35.2 parts by weight of water, 86.2 parts by weight of mesityl oxide and 144.2 parts by weight of sodium sulphite are initially introduced in the stated order in a stirred vessel with an internal thermometer and reflux condenser and are heated to 90° C.

352.0 parts by weight of 30% strength formaldehyde solution are then added dropwise uniformly in the course of 10 minutes with cooling. After the addition of the formaldehyde, the solution is stirred for a further hour at 90° C. After the solution has been adjusted to pH 10 with 50% strength sulphuric acid, it is heated to reflux and air is displaced from the reaction vessel by passing nitrogen through the solution for 30 minutes.

A solution of 2.8 parts by weight of 2,2'-azobis-(2-methylpropionitrile) (AIBN) and 180.0 parts by weight of N-vinylpyrrolidone is metered uniformly in the course of 20 minutes into the boiling initially introduced mixture by means of a peristaltic pump.

The solution is stirred for 3 hours at the boiling point, the viscosity increasing. After the graft polymer has cooled to room temperature, it is neutralised to pH 7 with 50% strength sulphuric acid.

The red highly viscous polymer solution has a solids content of 49% by weight.

Example A.19

An aldol condensate without an acid function is prepared analogously to the method according to Houben-Weyl, Volume 14/II, 1963, page 442, Example 3 (a).

696 parts by weight of acetone, 2,178 parts by weight of 30% strength formaldehyde solution and 20 parts by weight of potassium carbonate dissolved in 35 parts by weight of water are initially introduced in the stated order in a glass beaker.

The clear solution heats up to the boil in the course of 45 minutes. It is allowed to stand for 26 hours and is then neutralized with concentrated hydrochloric acid. The colorless solution is then concentrated on a rotary evaporator from a solids content of 17% to about 40% in order to remove remaining acetone and formaldehyde.

The completely water-soluble resin solution obtained is colorless and has a Brookfield viscosity of 150 mPas and a solids content of 41.4%.

500 parts by weight of 20% strength aldol condensate solution which was prepared by the above method are initially introduced in a stirred vessel with an internal thermometer and reflux condenser, adjusted to pH 7 with 50% strength sulphuric acid and heated to 90° C. Air is displaced from the stirred vessel by a continuous stream of nitrogen.

A solution consisting of 2.9 parts by weight of 2,2'-azobis-(2-methylpropionitrile) (AIBN) and 100.0 parts by weight of N-vinylpyrrolidone is metered uniformly into the initially introduced mixture in the course of 20 minutes by means of a peristaltic pump.

The solution is stirred for 3 hours at 90° C. and diluted with water as required. The resulting yellow highly viscous polymer solution has a solids content of 19% by weight.

B. Use Examples

B.1 Dispersing Portland Cement

In a dose of 0.5% by weight, based on the cement content, a graft polymer prepared according to Examples A.3 and A.13 increases the spread of Portland cement of Class 35 F (water/cement ratio=0.48) by 50% and 40%, respectively, at room temperature.

B.2 Dispersing β-hemihydrate Plaster

In a dose of 1% by weight, based on the amount of plaster (302 g of β-hemihydrate plaster, 90 g of water and 3 g of graft polymer), a graft polymer prepared according to Examples A.3 and A.13 increases the spread by 150% and 100%, respectively, at room temperature. The grafting backbone (cyclohexanone/formaldehyde/sodium sulphite) for Example A.3, on the other hand, increases the spread of the plaster by only 60%.

B.3 Dispersing Oil Well Cement Slurries

The dispersing action of graft polymers according to the invention in oil well cement slurries is shown in Table 2.

The dose of graft polymers is 1.0% by weight, based on the cement content. The cement slurries, consisting of Class H cement and water (water/cement ratio=0.38), are prepared according to the standard conditions of API RP 10 B and were measured using a Fann 35 SA viscometer at 38° C. and four different shear gradients.

TABLE 2

Decrease in the viscosity by x% at four different shear gradients

| Preparation Example | Percentage decrease of the Fann viscosity at rpm | | | |
|---|---|---|---|---|
|  | 600 | 300 | 200 | 100 |
| Blank cement slurry | 0 | 0 | 0 | 0 |
| A.3 | −63 | −80 | −85 | −91 |
| A.6 | −49 | −65 | −69 | −72 |
| A.13 | −69 | −83 | −88 | −93 |

B.4 Dispersing Bentonire Suspensions

Bentonire is used as an additive, inter alia in drilling fluids, for improving the removal of drill cuttings. However, the drilling fluid must remain pumpable, that is to say the increase in viscosity due to drill solids must be controlled from time to time by viscosity-reducing additives. The viscosity-reducing effect of graft polymers according to the invention in 8% strength by weight of bentonite suspension is shown in Table 3. The measurement of the rheology was carried out at room temperature using a Fann 35 SA viscometer.

TABLE 3

Decrease (−) or increase (+) in the viscosity of an 8% strength by weight bentonite suspension after the addition of 3% by weight of graft polymer or backbone

| Preparation Examples | Percentage decrease (−) or increase (+) of the Fann viscosity at rpm | | | | | |
|---|---|---|---|---|---|---|
|  | 600 | 300 | 200 | 100 | 6 | 3 |
| 8% strenght by weight bentonite suspension | 0 | 0 | 0 | 0 | 0 | 0 |
| A.1 | −54 | −78 | −82 | −85 | −90 | −90 |
| Backbone A.1 | +18 | +15 | +19 | +17 | +6 | +4 |
| A.5 | −47 | −67 | −69 | −75 | −83 | −83 |
| A.7 | −51 | −56 | −58 | −58 | −58 | −58 |
| Backbone A.7 | +18 | +15 | +19 | +17 | +6 | +4 |
| A.10 | −33 | −35 | −38 | −40 | −42 | −42 |

B.5 Thickener for Oil Well Cement Slurry

If 1.0% by weight, based on the cement content, of a graft polymer prepared according to A.4 is metered into a Class H cement/water slurry (water/cement ratio=0.38) which is prepared according to the standard conditions of API SPEC 10, the following viscosity-increasing effect can be measured.

TABLE 4

Increase in the viscosity by x% at four different shear gradients (38° C.)

| Preparation Example | Percentage increase of the Fann viscosity at rpm | | | |
|---|---|---|---|---|
| | 600 | 300 | 200 | 100 |
| Blank cement slurry | 0 | 0 | 0 | 0 |
| A.4 | +21 | +23 | +24 | +37 |
| Backbone of A.4 | −26 | −45 | −50 | −54 |

B.6 Thickener for Bentonite Suspensions

If 3.0% by weight of graft polymer prepared according to A.13 is metered into an 8% strength by weight bentonite suspension, the following viscosity-increasing effect can be measured.

TABLE 5

Increase in the viscosity by x% of an 8% strength by weight bentonite suspension

| Preparation Example | Percentage increase of the Fann viscosity in rpm | | | | | |
|---|---|---|---|---|---|---|
| | 600 | 300 | 200 | 100 | 6 | 3 |
| A.13 | +38 | +38 | +37 | +31 | +24 | +24 |

B.7 Flowing Concrete

Graft polymers prepared according to Examples A.3, A.6 and A.13 are suitable for the production of flowing concrete according to the "Guidelines for the production and processing of flowing concrete" in the version of May 1974, as cited, for example, in the journal "Beton" 24 (1974) on pages 342 to 344.

TABLE 6

Increase in the concrete spread by x% at 0.4% by weight dose (based on the cement content)

| Example | Percentage increase of the spread |
|---|---|
| A.3 | 35 |
| A.6 | 31 |
| A.13 | 33 |

B.8 Bonding of Gas Concrete with Mortar or Cement Paste

Graft polymer prepared according to Example A.2 can be used for the preparation of mortar or cement paste with high water retention, as, for example, for the bonding of gas concrete.

The gas concrete is bonded by the cement paste so firmly that no break occurs in the joint after 24 hours.

B.9 Inhibition of Swelling of Clays

Cationic graft polymers according to the invention prevent the swelling of clays. If, for example, clay-containing drill cuttings from oil wells are introduced into a 2% strength by weight aqueous solution of the graft polymer according to Example A.16, the pieces of the drill cuttings remain intact. No disintegration or increase in volume occurs. In water without the graft polymer according to the invention, the drill cuttings in the form of pieces do undergo swelling. The individual particles stick together to form a lump which occupies a multiple of the original inherent volume and desintegrates into fine clay particles.

B.10 Retention Agent for Bentonire Suspension

The filtrate water loss of an 8% strength by weight bentonire suspension, which loss is determined according to the standard conditions of API 13 B-1 (25° C., 0.7 mPa, 30 minutes), can be reduced by adding 3% by weight of graft polymer.

TABLE 6

Reduction of the API filtrate water loss of an 8% strength by weight bentonite suspension

| Preparation Example | Reduction of the filtrate water loss by % |
|---|---|
| A.9 | −41 |
| A.13 | −33 |

It will be understood that the specification and examples are illustrative but not limitative to the present invention and that other embodiments within the spirit and scope of the invention will suggest themselves to those skilled in the art.

We claim:

1. A graft polymer of ketone-aldehyde condensation and co-condensation products and/or monovalent or polyvalent metal compounds thereof, produced by:
   (i) grafting an anionic and/or nonionic and/or cationic unsaturated monomer onto a water-soluble condensation product, wherein said condensation product comprises:
      (a) a symmetrical or asymmetrical ketone containing aliphatic, araliphatic, cyclic or aromatic hydrocarbon radicals with at least one nonaromatic radical;
      (b) an aldehyde of the formula R—(CHO)$_n$, wherein n=1 or 2, and R is hydrogen or an aliphatic, araliphatic, aromatic or heterocyclic radical; and
      (c) optionally an acid group, said grafting being carried out in an aqueous solution.

2. The graft polymer of claim 1 wherein said acid group is selected from the group consisting of a carboxyl, sulpho, sulphamido, sulphoxy, sulphoalklamine and sulphoalkyloxy group.

3. The graft polymer of claim 1, wherein the total number of carbon atoms and hetero atoms in the ketones is 4 to 12.

4. The graft polymer of claim 1, wherein the total number of carbon atoms and hetero atoms in the aldehydes is 2 to 11.

5. The graft polymer of claim 1, wherein the molar ratio of ketone:aldehyde:acid group is 1:0.5 to 18:0 to 3.

6. The graft polymer of claim 1, wherein the co-condensation components for the ketone-aldehyde condensation product are aminoplast formers and/or aromatic compounds or condensation products thereof.

7. The graft polymer of claim 6, wherein the aminoplast former consists of urea, melamine, dicyandiamide or a guanamine.

8. The graft polymer of claim 6, wherein the aromatic compound is a phenol derivative.

9. The graft polymer of claim 6, wherein the aromatic compound is a naphthalene derivative.

10. The graft polymer of claim 1, wherein the co-condensation component for the ketone-aldehyde condensation product is a lignin and/or lignite derivative.

11. The graft polymer of claim 1, wherein the metal compounds of the condensation and co-condensation products contain metals of Group IIA to VIIIA and/or of Group IB to VB.

12. The graft polymer of claim 1, wherein the grafted unsaturated monomer is anionic and is a vinyl compound containing carboxyl, sulpho or phosphoric acid groups.

13. The graft polymer of claim 1, wherein the nonionic unsaturated monomer is a vinyl or acrylic derivative.

14. The graft polymer of claim 1, wherein the cationic unsaturated monomer is a quaternary ammonium compound.

15. The graft polymer of claim 1, wherein the weight ratio of ketone-aldehyde condensation or co-condensation product to unsaturated monomer is 1:0.02 to 10.

16. A process for the preparation of a graft polymer comprising:

grafting an unsaturated monomer onto a ketone-aldehyde condensation or co-condensation product in an aqueous solution at a temperature of 0° to 100° C.

17. A dispersant for inorganic binder suspensions and solutions, for aqueous clay suspensions and solutions or coal/water suspensions comprising a graft polymer of claim 1.

18. The dispersant of claim 17 wherein the ketone-aldehyde condensation product has a molecular weight of <150,000 and a high content of acid groups and/or anionic monomers.

19. A retention agent comprising a graft polymer of claim 1.

20. The retention agent of claim 19 wherein the retention agent comprises graft polymers on the basis of long-chain ketone-aldehyde condensation products having a molecular weight of >50,000, the graft polymers having an anionic, non-ionic, or cationic charge.

21. A thickener comprising a graft polymer of claim 1.

22. The thickener of claim 21 wherein the thickener comprises a graft polymer on the basis of very long-chain ketone-aldehyde condensation products having a molecular weight of >75,000, the graft polymers having an anionic, non-ionic, or cationic charge.

23. An agent for preventing the swelling of clay in aqueous systems comprising a graft polymer of claim 1.

24. The agent of claim 23 wherein the agent comprises graft polymers on the basis of short-chain to long-chain ketone-aldehyde condensation products having a molecular weight of 500 to 2,000,000, the graft polymers having a cationic or neutral charge.

* * * * *

UNITED STATES PATENT AND TRADEMARK OFFICE
CERTIFICATE OF CORRECTION

PATENT NO. : 5,705,599
DATED : January 6, 1998
INVENTOR(S) : FELIXBERGER et al.

It is certified that error appears in the above-identified patent and that said Letters Patent is hereby corrected as shown below:

In column 1, line 21, change "Offenlegungsschrfit" to -- Offenlegungsschrift --.

In column 1, line 33, after "the", delete -- . --.

In column 2, line 46, change "3-methoxyproptonaldehyde" to -- 3-methoxypropionaldehyde --.

In column 2, line 55, change "aldehydes" to -- aldehyde --.

In column 3, line 18, change "preferable" to -- preferably --.

In column 3, line 65, change "iraconic" to -- itaconic --.

In column 6, line 6, after "after" insert -- a --.

In column 6, line 65, after "after" insert -- a --.

In column 8, line 56, change "colour" to -- color --.

In column 9, line 49, change "sodiumhydroxide" to -- sodium hydroxide --.

In column 9, line 63, after "after" insert -- a --.

UNITED STATES PATENT AND TRADEMARK OFFICE
CERTIFICATE OF CORRECTION

PATENT NO. : 5,705,599
DATED : January 6, 1998
INVENTOR(S) : FELIXBERGER et al.

It is certified that error appears in the above-identified patent and that said Letters Patent is hereby corrected as shown below:

In column 9, line 64, change "30minutes" to -- 30 minutes --.

In column 10, line 27, change "further30minutes" to -- a further 30 minutes --.

In column 10, line 59, change "further30minutes" to -- a further 30 minutes --.

In column 11, line 9, change "176.0parts" to -- 176.0 parts --.

In column 11, line 15, change "stirtable" to -- stirrable --.

In column 11, line 30, change "600°C" to -- 60°C --.

In column 11, line 39, change " 18.7. " to -- 18.7 --.

In column 13, line 50, change "stirtable" to -- stirrable --.

In column 14, line 20, change "after treatment" to -- aftertreatment --.

In column 15, line 14, change "neutralised" to -- neutralized --.

In column 16, lines 33 and 34, change "Bentonire" to -- Bentonite --.

In column 16, line 55, change "strenght" to -- strength --.

UNITED STATES PATENT AND TRADEMARK OFFICE
CERTIFICATE OF CORRECTION

PATENT NO. : 5,705,599

DATED : January 6, 1998

INVENTOR(S) : FELIXBERGER et al.

It is certified that error appears in the above-identified patent and that said Letters Patent is hereby corrected as shown below:

In column 18, line 9, change "desintegrates" to -- disintegrates --.

In column 18, line 10, change "bentonire" to -- bentonite --.

In column 18, line 12, change "bentonire" to -- bentonite --.

In column 18, line 28, change "to" to -- of --.

In Claim 2, column 18, line 49, change "sulphoalklamine" to -- sulphoalkylamine --

Signed and Sealed this

Fifteenth Day of August, 2000

Attest:

Attesting Officer

Q. TODD DICKINSON

Director of Patents and Trademarks